Aug. 23, 1932.  J. F. MORAN  1,873,622
LAWN SPRINKLER
Filed March 25, 1931    2 Sheets-Sheet 1
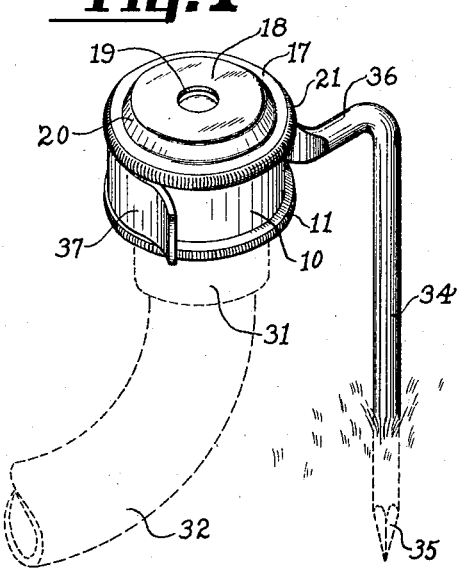
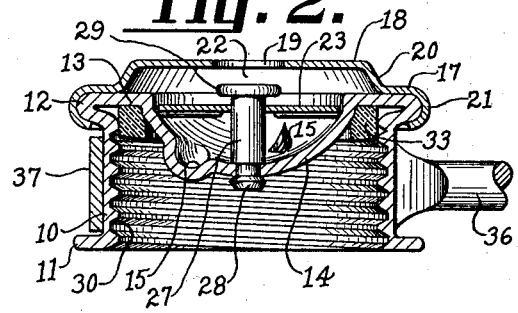
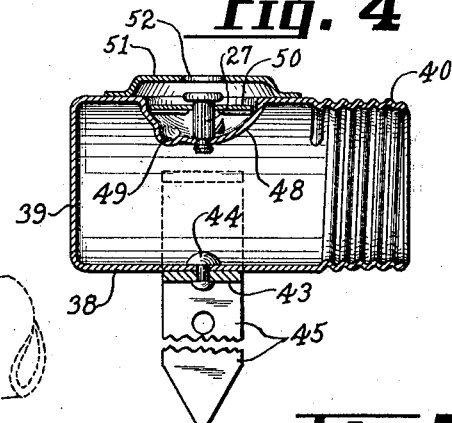
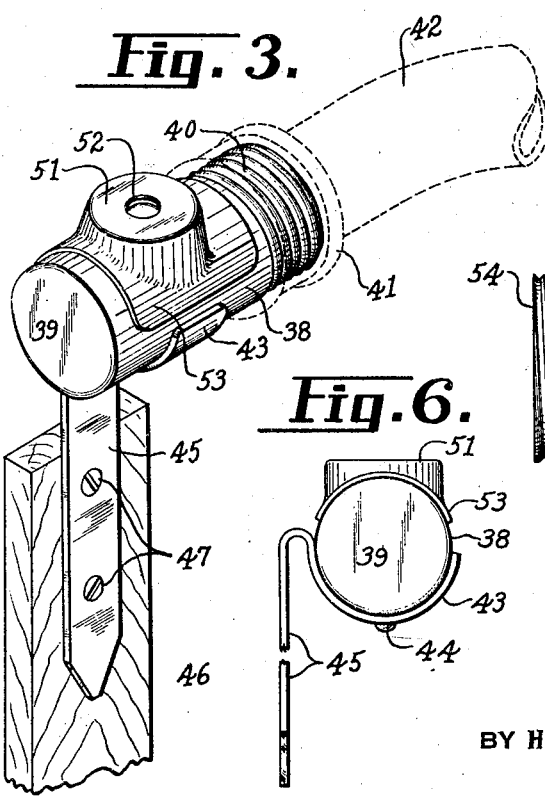
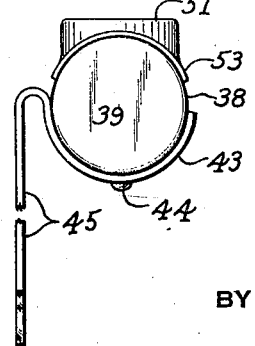
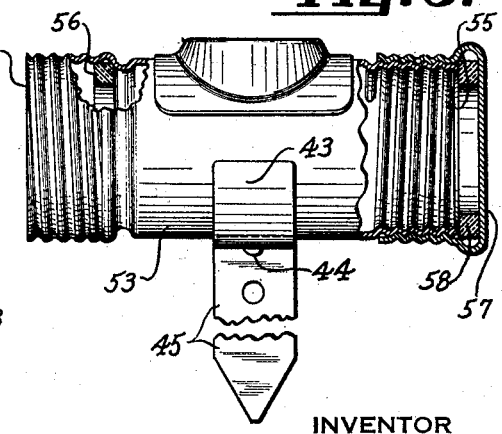
INVENTOR
Joseph F. Moran.
BY HIS ATTORNEY
H. G. Manning

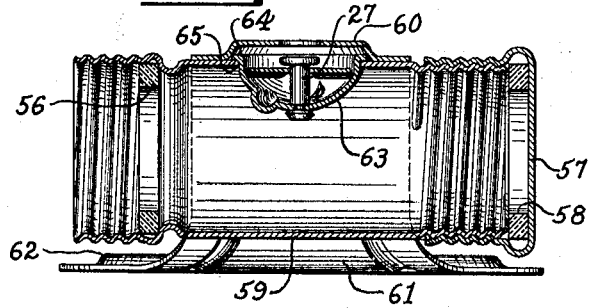
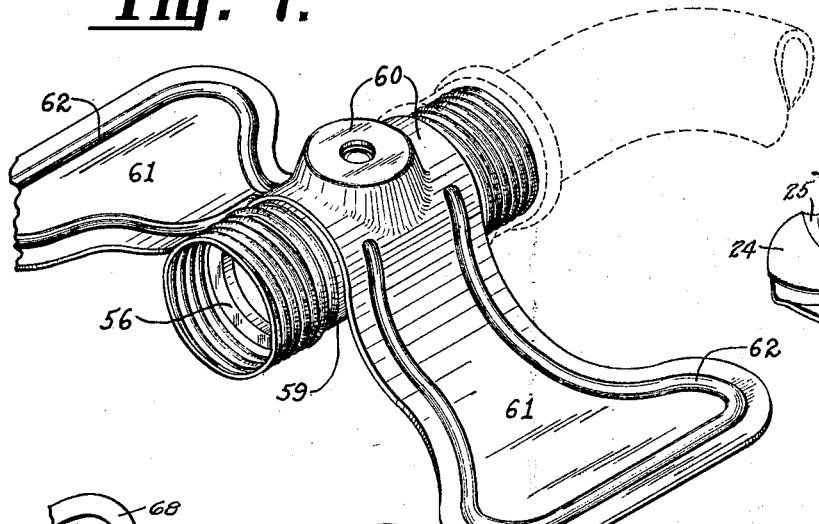
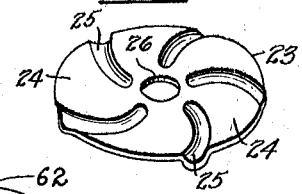
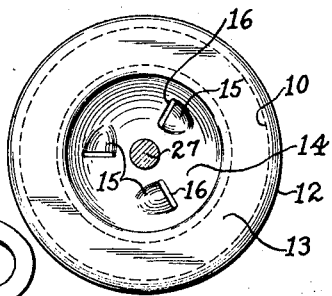

Patented Aug. 23, 1932

1,873,622

UNITED STATES PATENT OFFICE

JOSEPH F. MORAN, OF WATERBURY, CONNECTICUT, ASSIGNOR TO SCOVILL MANUFACTURING COMPANY, OF WATERBURY, CONNECTICUT, A CORPORATION OF CONNECTICUT

LAWN SPRINKLER

Application filed March 25, 1931. Serial No. 525,099.

This invention relates to automatic lawn sprinklers, and more particularly to a sprinkler of the above nature adapted to produce an atomized "rose" spray for uniformly distributing a stream of water from a hose over a large area of a lawn.

One object of the invention is to provide a lawn sprinkler of the above nature, in which the water to be distributed is first broken up by a rotating turbine, and then passed out of the sprinkler casing through an apertured cap covering said turbine, whereby a spreading spray is produced.

A further object is to provide a lawn sprinkler of the above nature having improved means for supporting it in raised position above the surface of the ground.

A further object is to provide a lawn sprinkler of the above nature which may be used alone or in series with other similar sprinkler units, the adjacent units being connected together by a plurality of hose sections.

A further object is to provide a lawn sprinkler of the above nature which will be simple in construction, inexpensive to manufacture, easy to install and manipulate, free from vibration, compact, ornamental in appearance, and very efficient and durable in use.

With these and other objects in view there have been illustrated on the accompanying drawings, five forms in which the invention may be conveniently embodied in practice.

In the drawings:

Fig. 1 represents a perspective view of the first form of lawn sprinkler embodying the invention as it appears in operating position supported above the ground with a hose nozzle connected thereto.

Fig. 2 is a transverse sectional view of the same.

Fig. 3 is a perspective view of a second form of lawn sprinkler, as it appears when supported above the ground with a hose coupling connected thereto.

Fig. 4 is a longitudinal sectional view of the lawn sprinkler shown in Fig. 3.

Fig. 5 is a fragmentary sectional view of a third form of sprinkler which may be used either as an "intermediate" or as a "terminal" nozzle.

Fig. 6 is an end view of the sprinkler shown in Fig. 4.

Fig. 7 is a perspective view of a fourth form of the invention, having flat side wings for supporting the nozzle close to the ground.

Fig. 8 is a longitudinal sectional view of the same.

Fig. 9 is a perspective view of one of the turbine members employed in each form of the invention.

Fig. 10 is a top plan view of the sprinkler casing of the first form of the invention, with the turbine and cap removed to show the interior construction.

Fig. 11 is a perspective view similar to Fig. 7 of a fifth form of the invention having open side wings constructed of heavy wire.

Referring now to the drawings in which like reference numerals denote corresponding parts throughout the several views, the first form of lawn sprinkler shown in Figs. 1, 2, and 10, consists of a hollow spool-shaped cylindrical vertical casing 10 having an enlarged knurled lower flange 11 and an annular bead 12 at its upper end. Extending inwardly from and integrally connected to the bead 12 is a flat annular section 13 having a depressed central inverted dome 14 formed therein, said dome being provided with a plurality of angular depressions 15, each of which has a slit 16 on one side thereof, there being three of such depressions 15 in the present instance.

Mounted upon the top of the casing 10 is a cap member 17 having a raised flat top section 18 within which is a circular outlet aperture 19. The flat top section 18 is integrally connected at its outer periphery with a conical downwardly-inclined section 20 having an inturned knurled annular bead 21 at its lower end bent tightly about the bead 12 at the top of the casing 10. Within the space between the dome 14 and top section 18 of the cap member 17, a turbine disc 23 is mounted. As most clearly shown in Fig. 9, said turbine disc is provided with a plurality of flat radial sections 24, five in this instance, separated by an equal number of downwardly spiral-shaped convex ribs, the outer edges 25 of said ribs normally resting upon the upper wall of the dome 14. The turbine disc 23 has a central aperture 26 for loosely fitting around a vertical spindle 27 which has a reduced lower end passing through an aperture at the bottom of the dome 14 and headed over at 28 under the lower wall thereof. The diameter of the disc 23 is slightly less than that of the upper part of the dome 14, as shown in Fig. 2.

The upper end of the spindle 27 is provided with a flange 29 for limiting the upward movement of the turbine disc 23 under the pressure of the water passing through the sprinkler. The interior wall 30 of the cylindrical portion of the casing 10 is threaded to receive a standard nozzle 31 of a garden hose 32, as shown in dotted lines in Fig. 1. The end of said nozzle 31 is adapted to engage against a rubber washer 33 of rectangular cross-section for producing a water-tight seal.

In order to support the sprinkler at an elevated position above the lawn, provision is made of a vertical ground-engaging rod 34 having a pointed lower extremity 35 and a horizontal upper section 36, said upper section including a resilient clip 37 adapted to fit snugly and detachably around the casing 10 between the flanges 11 and 12 thereof.

Operation

In the operation of the first form of the invention, the water from the hose 32, in passing upwardly through the slits 16 of the depressions 15, will impinge against the turbine disc 23 and be deflected outwardly into the space 22. The water will then move inwardly and pass upwardly out of the nozzle through the central aperture 19, emerging from the sprinkler in an interrupted stream of finely divided atomized drops of water, which will spread outwardly over a wide area due to the rotative energy stored up therein.

The modified form of sprinkler shown in Figs. 3, 4 and 6 comprises a horizontal shell 38, having one end 39 closed and the other end 40 threaded for receiving a coupling 41 fastened to the end of a hose 42, as shown in Fig. 3. The shell 38 is seated in a curved metal strip section 43 to which it is connected, as by a rivet 44. The curved section 43 is formed integral with a downwardly extending strip 45 secured to the top of a wooden ground-engaging post 46, as by a pair of screws 47.

The top of the shell 38 is provided with an inverted dome 48 similar in all respects to the dome 14 shown in the first form of the invention. Thus, the dome 48 is perforated at three points 49, as before, to permit the passage of water upwardly therethrough for rotating a turbine disc 50 identical with the turbine 23 previously described. The turbine disc 50 is covered by a flat cap member 51 having a central circular aperture 52 as before, and said cap member 51 has a pair of curved flanges 53 shaped to fit about the cylindrical surface of the shell 38, to which surface they are secured as by soldering.

When the second form of sprinkler, illustrated in Figs. 3, 4 and 6, is connected with the hose 42 and the water is turned on, the spreading spray or mist which emerges from the aperture 52 will be similar in all respects to the spray formed by the sprinkler shown in Figs. 1 and 2.

The third form of lawn sprinkler shown in Fig. 5 is identical in all respects with the second form shown in Figs. 3, 4 and 6, except that instead of having a shell with a closed end, a shell 53 is provided having two open ends 54 and 55, both of which are threaded. The end 54 is enlarged for receiving the nozzle 31 of the garden hose 32, a washer 56 being employed to prevent leakage. The end 55 is adapted to receive the coupling 41 of a hose 42 when it is desired to connect the sprinkler to another similar sprinkler.

It will be understood that any number of sprinklers may be scattered at different points about a lawn, all of them being operated from one source of water supply and connected together by hose sections, each of which has a nozzle 31 on one end and a coupling 41 on the other end.

It will also be understood, that when it is desired to use this third form of shell 53 as a terminal sprinkler, it will merely be necessary to screw a threaded cap 57 having a knurled bead on its outer end over the threaded end 55 of said shell 53, a washer 58 being preferably provided within said cap 57 to form a water-tight seal therein.

In the fourth form of the invention shown in Figs. 7 and 8, the sprinkler comprises a shell 59, identical in all respects with that of the third form, shown in Fig. 5, except for the construction of the dome 63 and the cap 60, which in this instance has a pair of downwardly-extending flared curved wing sections 61 for supporting the shell 59 close to the ground, said wings 61 being provided with curved ribs 62 adjacent their peripheries for strengthening purposes. The cap 60 may be secured to the shell 59 in any desired manner, as by soldering.

The shell 59 is provided with a dome 63 which is made separately therefrom, and has an annular flange 64 adapted to fit within a circular seat 65 in the top of said shell, to which it is attached, as by soldering.

In the modified fifth form of the invention shown in Fig. 11, the shell 66 is covered by a cap member 67 similar in all respects to the cap member 51 of the third form shown in Figs. 3, 4 and 6. The shell 66 is supported upon an open flared wing-shaped frame 68, constructed of heavy wire and secured as by soldering to the underside of said shell 66.

One advantage of the four last illustrated forms of the invention is that the sprinklers may be located closer to the ground than was possible with the first form of the invention. This is due to the fact that the hose nozzle 31 and coupling 41 may be held in horizontal positions when screwed upon the threaded ends of the shells.

Another advantage of the present invention is that practically all parts of the sprinkler can be readily made at a relatively low cost from sheet metal in automatic stamping presses and screw machines.

While there have been disclosed in this specification five forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a lawn sprinkler, a casing having a depressed inverted perforated dome on one side thereof, said dome having inclined apertures for whirling the water passing therethrough, a disc spaced from said dome for breaking up the water passing around the periphery thereof, and an apertured cap spaced from and covering said disc for producing an atomized outwardly spreading spray.

2. In a lawn sprinkler, a casing having a spherical inverted perforated dome at the top end thereof, means for admitting a supply of water under pressure to said casing underneath said dome, a turbine disc rotatably mounted upon said dome for braking up the stream of water passing around the periphery thereof, and an apertured cap covering said disc.

3. In a lawn sprinkler, a spool-shaped casing having upper and lower flanges, means for admitting water under pressure to the lower end of said casing, a nozzle cap covering the upper end of said casing, a stationary diaphragm having tangential apertures for causing the water to whirl, a disc located above said diaphragm for disintegrating the water passing around its edge, said casing having a top cap provided with a delivery aperture.

4. In a lawn sprinkler, a casing having a spherical inverted perforated dome at the top end thereof, means for admitting a supply of water under pressure to said casing underneath said dome, a turbine disc rotatably mounted upon said dome for breaking up the stream of water passing around the periphery thereof, and an outlet cap having a single central delivery aperture connected to the top of said casing above said turbine disc.

5. In a lawn sprinkler, a cylidrical casing having a perforated end wall, a turbine disc rotatably mounted on said wall for breaking up the stream of water passing through said wall and around the periphery of said disc, and an outlet cap having a single aperture connected to said casing above said turbine disc, the perforations in said end wall being angular to deflect the stream outwardly.

6. In a lawn sprinkler, a casing having a perforated end wall, a turbine disc rotatably mounted on said wall for outwardly deflecting the stream of water passing through said wall, and an outlet cap having a single aperture connected to said casing above said turbine disc.

7. In a lawn sprinkler, a cylindrical casing having a perforated end wall, a turbine disc rotatably mounted on said wall for outwardly deflecting the stream of water passing through said wall, and an outlet cap having a single aperture connected to said casing above said turbine disc, the lower portion of said casing being internally threaded to receive a water supply nozzle.

8. In a lawn sprinkler, a casing having a perforated diaphragm for producing a whirling action in the stream passing therethrough, a disc above said diaphragm for outwardly deflecting the stream, and an outlet cap having a single aperture connected to said casing above said disc.

9. In a lawn sprinkler, a casing having at one end an inlet for a supply of water under pressure, a depressed perforated dome in one side of said casing, a turbine disc rotatably mounted within said dome for outwardly deflecting said water, and an outlet cap having a single aperture in alinement with the axis of said turbine disc mounted upon the outside of said casing.

10. In a lawn sprinkler, a cylindrical casing having at one end an inlet for a supply of water under pressure, a depressed perforated dome in one side of said casing, a turbine disc rotatably mounted within said dome for outwardly deflecting said water, and an outlet cap having a single aperture in alinement with the axis of said turbine disc mounted upon the outside of said casing.

11. In a lawn sprinkler, a casing having at one end an inlet for a supply of water under pressure, a depressed perforated dome in one side of said casing, a turbine disc rotatably mounted within said dome for outwardly deflecting said water, an outlet cap having a single aperture in alinement with the axis of said turbine disc mounted upon the outside of said casing, and a sprinkler-supporting member secured to the opposite side of said casing from said cap.

12. In a lawn sprinkler, a casing having an outlet wall section, a shaft upstanding from said wall section, a turbine disc rotatively mounted on said shaft, the top of said shaft having a flange for limiting the upward movement of said turbine disc, and an apertured cap member covering said disc.

In testimony whereof, I have affixed my signature to this specification.

JOSEPH F. MORAN.